United States Patent
Holtmanns et al.

(10) Patent No.: US 9,603,189 B2
(45) Date of Patent: Mar. 21, 2017

(54) METHOD AND APPARATUS FOR MULTISIM DEVICES WITH EMBEDDED SIM FUNCTIONALITY

(71) Applicant: Nokia Technologies Oy, Espoo (FI)

(72) Inventors: Silke Holtmanns, Klaukkala (FI); Alireza Sohi, Alleroed (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/765,749

(22) PCT Filed: Mar. 8, 2013

(86) PCT No.: PCT/CN2013/072365
§ 371 (c)(1),
(2) Date: Aug. 4, 2015

(87) PCT Pub. No.: WO2014/134829
PCT Pub. Date: Sep. 12, 2014

(65) Prior Publication Data
US 2015/0373778 A1   Dec. 24, 2015

(51) Int. Cl.
*H04W 88/06* (2009.01)
*H04B 1/38* (2015.01)
(Continued)

(52) U.S. Cl.
CPC .......... *H04W 88/06* (2013.01); *H04B 1/3816* (2013.01); *H04W 8/205* (2013.01)

(58) Field of Classification Search
CPC ..... H04W 88/06; H04W 8/205; H04B 1/3816
See application file for complete search history.

(56) References Cited

U.S. PATENT DOCUMENTS 8,306,505 B2   11/2012   Bennett
9,026,082 B2*   5/2015   Lindholm ................ 455/411
(Continued)

FOREIGN PATENT DOCUMENTS

CN   1826788 A   8/2006
CN   102870443 A   1/2013
(Continued)

OTHER PUBLICATIONS

3GPP TR 33.812 v9.1.0 (Apr. 2010) 3rd Generation Partnership Project; Technical Specificaiton Group Services and System Aspects; Feasibility study on the security aspects of remote provisioning and change of subscription for Machine to Machine (M2M) equipment (Release 9).*
(Continued)

*Primary Examiner* — Brandon Miller
(74) *Attorney, Agent, or Firm* — Mintz Levin Cohn Ferris Glovsky and Popeo, P.C.

(57) ABSTRACT

A method, corresponding apparatuses, and a computer program product for multiSIM devices with embedded SIM functionality are provided. The method comprises downloading at least one subscription from a secure application manager to a secure element with remote provisioning functionality within a user equipment. The method also comprises determining whether or not to assign an identity related to the at least one subscription. The method further comprises informing the user equipment of the at least one subscription being present upon assignment of the identity. With the claimed inventions, subscriptions and a pool of identities can be efficiently and flexibly managed and maintained remotely.

22 Claims, 3 Drawing Sheets

(51) Int. Cl.
*H04W 8/20* (2009.01)
*H04B 1/3816* (2015.01)

(56) References Cited

U.S. PATENT DOCUMENTS

| | | |
|---|---|---|
| 2005/0020308 A1 | 1/2005 | Lai |
| 2010/0064361 A1 | 3/2010 | Shewchuk et al. |
| 2011/0055565 A1* | 3/2011 | Murakami ............ H04L 63/061 713/168 |
| 2012/0196570 A1 | 8/2012 | Lindholm et al. |

FOREIGN PATENT DOCUMENTS

| | | |
|---|---|---|
| EP | 1703760 A2 | 9/2006 |
| EP | 2076071 A1 | 7/2009 |
| EP | 2461613 A1 | 6/2012 |
| EP | 2472925 A1 | 7/2012 |
| WO | WO-2011009496 A1 | 1/2011 |

OTHER PUBLICATIONS

3GPP TR 33.812 v9.1.0 (Apr. 2010) 3rd Generation Partnership Project; Technical Specification Group Services and System Aspects; Feasibility Study on the Security Aspects of Remote Provisioning and Change of Subscription for M2M Equipment (Release 9).*

International Search Report and Written Opinion received for corresponding Patent Cooperation Treaty Application No. PCT/CN2013/072365, dated Dec. 5, 2013, 11 pages.

Bender et al. "Evolution of SIM provisioning towards a flexible MCIM provisioning in M2M vertical industries". 16th International Conference on Inteligence in NExt Generation Networks, Oct. 2012, pp. 57-64.

* cited by examiner

METHOD AND APPARATUS FOR MULTISIM DEVICES WITH EMBEDDED SIM FUNCTIONALITY

RELATED APPLICATION

This application was originally filed as Patent Cooperation Treaty Application No. PCT/CN2013/072365 filed Mar. 8, 2013.

FIELD OF THE INVENTION

Example embodiments of this invention relate generally to mobile communication devices and methods and, more specifically, relate to a secure element with remote provisioning functionality, such as an embedded UICC (eUICC), and enhancements related thereto.

BACKGROUND OF THE INVENTION

Various abbreviations that appear in the specification and/or in the drawing figures are defined as below:
API Application Program Interface
BABT British Approvals Board Of Telecommunications
CSIM CDMA Subscriber Identity Module
eUICC embedded Universal Integrated Circuit Card
GSM Global System for Mobile Communications
GSMA GSM Association
IMEI International Mobile Equipment Identity
ISIM Internet Protocol Multimedia Services Identity Module
MNO Mobile Network Operators
OTA Over-The-Air
SIM Subscriber Identity Module
SM Subscription Manager
TAC Type Approval Code
UICC Universal Integrated Circuit Card
UE User Equipment
WCDMA Wideband Code Division Multiple Access
WLAN Wireless Local Access Network
3G Third Generation
4G Fourth Generation The following description of background art may include insights, discoveries, understandings or disclosures, or associations together with disclosures not known to the relevant art prior to the present invention but provided by the present invention. Some such contributions of the present invention may be specifically pointed out below, while other such contributions of the present invention will be apparent from their context.

3G cards are UICC cards and store a network access application such as SIM, USIM or ISIM applications. Previous 2G cards are referred to simply as SIM cards. A conventional UICC card or SIM card is issued by an operator and is used to access operator controlled services. The operator association GSMA requires that a dual SIM device has two IMEIs. In a classical case, a UE (for example, a handset or a smart phone) with multiple SIM card slots can detect when the SIM card has been changed by physical means.

A subscription related to a corresponding IMEI as above mentioned may identify, among other things, connectivity networks in which the UE can be used, and the individual settings relating to the subscription. These setting may include a network operator setting and a subscriber identifier of an end user. The end user might be an individual user, but may also be a corporation. According to conventional methods, the subscription data may be recorded on a small chip on which at least memory areas are arranged for protecting the sensitive parts of the aforementioned settings and loading them into the UE being used. In addition, this subscription data maybe encoded on a microcontroller operating as the processor unit for a device. Such a device is generally called a UICC for 3G communication technologies or a SIM for 2G communication technologies which is usually placed in a compact package generally referred to as a UICC card or a SIM card. The network access application which is traditionally stored on a SIM or UICC card can also be stored on other form factor like an embedded chip, a platform mounted chip, a logical unit on a larger processor, a protected memory card or a smart card. The chip may hold one or more sets of subscriptions or applications.

In the classical case, the UE has a binding between the IMEI and SIM card slot. Today a dual SIM product has two IMEIs and two SIM card slots. Each physical SIM card slot gets an IMEI assigned and the SIM card slotted into the slot then has the IMEI logically assigned.

SUMMARY OF THE INVENTION

The following presents a simplified summary of the present invention in order to provide a basic understanding of some aspects of the present invention. It should be noted that this summary is not an extensive overview of the present invention and that it is not intended to identify key/critical elements of the present invention or to delineate the scope of the present invention. Its sole purpose is to present some concepts of the present invention in a simplified form as a prelude to the more detailed description that is presented later.

In an example aspect of the invention, there is a method comprising downloading at least one subscription from a secure application manager to a secure element with remote provisioning functionality within a user equipment. The method also comprises determining whether or not to assign an identity related to the at least one subscription. The method further comprises informing the user equipment of the at least one subscription being present upon assignment of the identity.

In an example aspect of the invention, there is an apparatus comprising means for downloading at least one subscription from a secure application manager to a secure element with remote provisioning functionality within a user equipment. The apparatus also comprises means for determining whether or not to assign an identity related to the at least one subscription. The apparatus further comprises means for informing the user equipment of the at least one subscription being present upon assignment of the identity.

In another example aspect of the invention, there is an apparatus comprising at least one processor and at least one memory including compute program instructions. The at least one memory and computer program instructions are configured to, with the at least one processor, cause the apparatus at least to perform downloading at least one subscription from a secure application manager to a secure element with remote provisioning functionality within a user equipment. The at least one memory and computer program instructions are also configured to, with the at least one processor, cause the apparatus at least to perform determining whether or not to assign an identity related to the at least one subscription. The at least one memory and computer program instructions are further configured to, with the at least one processor, cause the apparatus at least to perform informing the user equipment of the at least one subscription being present upon assignment of the identity.

In yet another example aspect of the invention, there is provided a computer program product, comprising at least one computer readable storage medium having a computer readable program code portion stored thereon. The computer readable program code portion comprises program code instructions for downloading at least one subscription from a secure application manager to a secure element with remote provisioning functionality within an user equipment. The computer readable program code portion also comprises program code instructions for determining whether or not to assign an identity related to the at least one subscription. The computer readable program code portion further comprises program code instructions for informing the user equipment of the at least one subscription being present upon assignment of the identity.

By means of the method, apparatuses, and the computer program product as set forth above, subscriptions and a pool of identities (for example, IMEIs or certificates) can be efficiently and flexibly managed and maintained within the UE or from outside, such as the UE manufacturer or remote secure application manager. Further, by checking whether the subscription has been assigned a free identity (for example, IMEI or certificate), the pool of identities (for example, IMEIs or certificates) can be effectively used and therefore efficient utilization of the identity could be achieved.

BRIEF DESCRIPTION OF THE DRAWINGS

The embodiments of the present invention that are presented in the sense of examples and their advantages are explained in greater detail below with reference to the accompanying drawings, in which.

DETAILED DESCRIPTION OF EMBODIMENTS

While the making and using of various embodiments of the present invention are discussed in detail below, it should be appreciated that the present invention provides many applicable inventive aspects that can be embodied in a wide variety of specific contexts. The specific embodiments discussed herein are merely illustrative of specific ways to make and use the invention and do not delimit the scope of the invention.

To facilitate the understanding of embodiments of the present invention, a number of terms are defined below. For the purposes of understanding the terminology, terms defined herein have meanings as commonly understood by a person of ordinary skill in the areas relevant to the present invention. Terms such as "a," "an" and "the" are not intended to refer to only a singular entity, but include the general class of which a specific example may be used for illustration. A UICC card is a smart card which contains network access credentials and the corresponding applications, for example, SIM application, USIM application, ISIM application, and C-SIM application. As such, and even though the detailed description of this invention may make references to the term "USIM," it should be understood that this is only one potential application, and that reference could also be made to C-SIM or any other type of (for example, cellular) network access credentials and related data including but not limited to algorithms and configuration data. Additionally, the terminology herein is used to describe specific embodiments of the present invention, but their usage does not delimit the invention.

Today a dual SIM product has two IMEIs and two SIM card slots and it is needless for the UE to detect an actual change of a SIM card. However, this is not possible for eUICC SIM provisioning since the UE would not be aware that a new subscription is downloaded until the new subscription gets activated. Since in theory several USIMs can be put on one UICC, the same problem also holds for the case that remote provisioning and management functionality is put on a removable form factor. This has not been a problem till today, since operators do not put their competitors USIM on their UICC for business reasons, but technically the problem arises also in this case.

As noted previously, the UE with multiple SIM card slots can detect when the SIM card has been changed by physical means in the classical case. However, this approach does not work for the eUICC, where subscriptions are downloaded or deleted either directly by the user or remotely from a management server. Since there is only one chip which has a larger number of potential USIM applications (or ISIM/CSIM/SIM), the change or deletion of a subscription in the chip cannot be physically detected by the UE. Also, it would be hard for the users to know the number of subscriptions the UE actually uses, for example, the number of IMEIs really applied. In contrast, this is not a problem in the classical case since only two cards can be inserted if there are two slots. Although the maximum number of IMEIs can be reserved or pre-allocated for the UE at the manufacturing time, this is not an efficient way of assigning the IMEIs. Further, security enhanced devices do not only assign an IMEI to each slot, but also a cryptographic certificate to bind the device identity (for example, IMEI) to a subscription in a more secure fashion.

As was made apparent above, in case of eUICC enabled for multiple subscriptions, problems regarding how many subscriptions and IMEIs or certificates containing the IMEIs would be needed for the multi-SIM/eUICC utilization environment may arise. In other words, how to efficiently manage and maintain the certificates and subscriptions need to be addressed with respect to the use of the eUICC.

Figure 1:
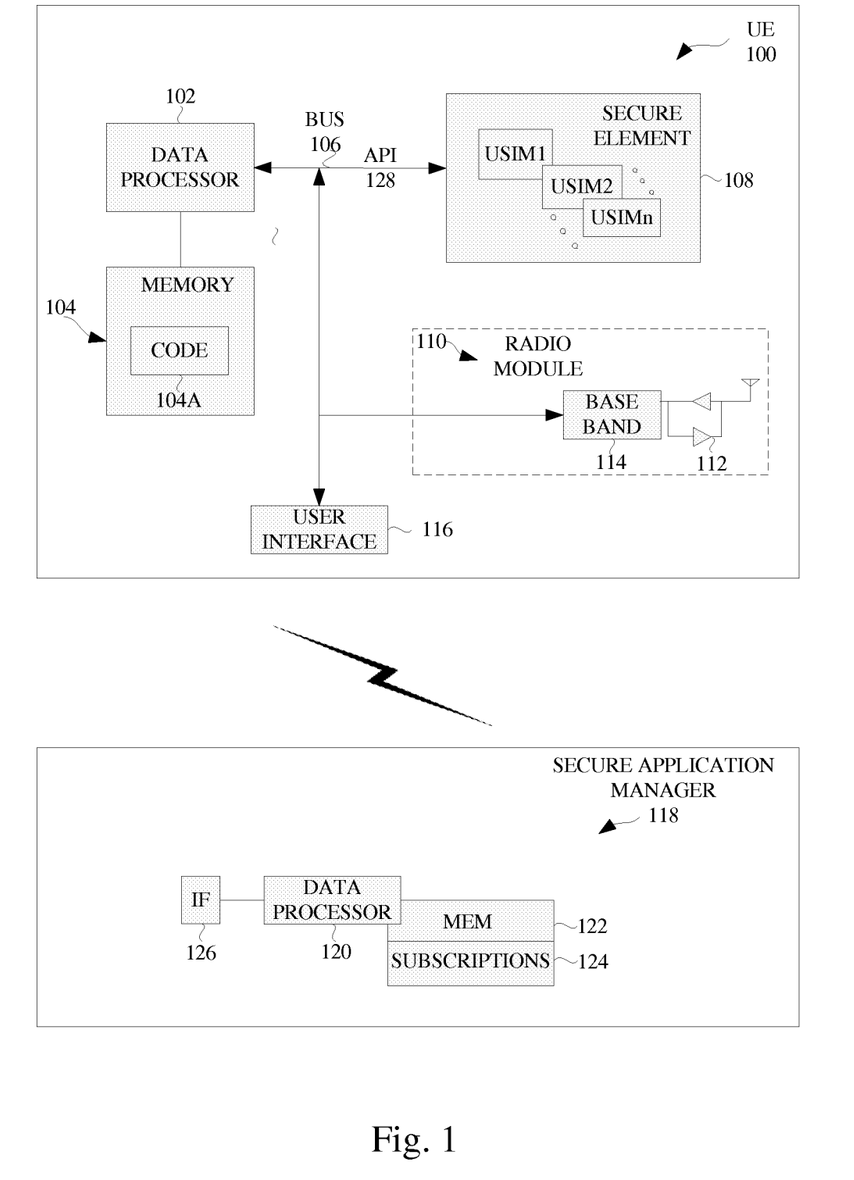
FIG. 1 illustrates a simplified block diagram of a UE that includes a multi-SIM such as a security element that contains more than one subscription.

FIG. 1 is a block diagram of a system, such as a mobile system or equipment or, even more generally, a UE 100 (for example, a cellular phone, a smart phone, a tablet computer, or a personal digital assistant (PDA)). The UE 100 includes at least one data processor 102, at least one memory 104 (such as ROM and RAM (for example, DRAM or DRAM in combination with SRAM and/or a disk) that stores computer program code (instructions) 104A for execution by the data processor 102, as well as data that is used/generated during execution of the program code 104A. The stored program code may be assumed in many embodiments to include an operating system (OS) and various application programs. The UE 100 can also include at least one data/address/command bus 106 and at least one secure element 108 with remote provisioning functionality that is operated in accordance with the example embodiments of the present invention. The secure element 108 may store one or more subscriptions (for example, USIM1, USIM2 . . . USIMn). The secure element 108 may take the form of a plug-in card (for example, UICC, memory card), removable chip, or it may be embedded in the UE 100 (for example, physically embedded eUICC or chip). That is, the secure element 108 can be implemented on a removable or non-removable form factor. Although FIG. 1 shows three USIMs in the secure element 108, the secure element can store any number of USIM, SIM, C-SIM applications and/or subscriptions. Additionally, the secure element 108, according to example embodiments of the present invention, may contain subscriptions (USIM/ISIM/CSIM or SIM and related data) used for other applications, for example, banking, ticketing, payment, and WLAN.

According to example embodiments, the UE 100 can also include other components including two or more radio modules 110 (which may preferably be capable of simultaneous operation) each including at least one wireless transceiver 112 and related baseband (BB) circuitry 114. Additionally, the UE 100 may include appropriate user interface components 116 such as a touch-sensitive display, microphone and speaker(s). As an example, the touch-sensitive display can emulate the operation of a keyboard enabling the user to enter alphanumeric information, as well as to activate various soft command/control buttons. The user may be use the display to view which subscriptions are present or become active in the UE. Alternatively, the UE 100 may also be a terminal without a keyboard or touch-screen, for example, a metering machine, vending machine, or car. Other components, including one or more digital cameras, can also be present depending on the specific construction of the UE 100. The UE 100 may be embodied as a mobile phone, a tablet, a laptop with cellular capability or any other machine that has cellular communication capability (for example, Internet machines and/or devices capable of machine-to-machine communication).

The radio modules 110 can be adapted and configured for operation with any desired type of wireless radio communications including 3G technologies such as WCDMA and 4G technologies such as long term evolution (LTE). In some example embodiments, one or more of the radio modules could be configured to operate with a shorter range (local) wireless technology such as Wi-Fi technology or near field communication (NFC). In other words, the examples of the embodiments of the present invention are not limited for use with any one particular type or types of wireless communication techniques and apparatus.

A secure application manager 118 shown in FIG. 1 may be configured to manage subscriptions, each of which may be linked with a device identity (for example, an IMEI or certificate). The secure application manager 118 may include local data processing capability embodied in at least one processor 120 connected to at least one memory 122 for storing subscriptions 124. The memory 122 may also be used to store a pool of identities (for example IMEIs or certificates.) The secure application manager 118 may include some type of interface (IF) 126 for communicating with the UE 100. The interface 126 may be implemented as one or more of a wired interface and a wireless interface, such as a wireless interface one made via a network operator radio infrastructure. For instance, the wireless interface may include but not be limited to a cellular interface or a WLAN interface.

In accordance with example embodiments of the present invention, the UE 100 may also include an application program interface referred to herein as API 128, which is shown in FIG. 1 to be (logically or physically) interposed between the data processor 102 and the secure element 108.

The API 128 may be used by the secure element 108 to inform the UE 100 when various events occur, for example, when a subscription has been downloaded from the secure application manager 118, when a subscription is present, when a subscription has been made active, when an identity (for example, an IMEI or certificate) needs to be assigned to a subscription, or when an identity (for example, an IMEI or certificate) has been assigned to a subscription. To this end, the API 128 may comprise a physical interface and one or more commands in a secure element management command set. In addition, the API 128 may comprise a flag or indicator which indicates when a (subscription, device identity) binding has been performed or a (subscription, device identity) mapping has been achieved. In this way, the user of the UE would be apprised of the number of subscriptions that reside in or have been downloaded to the secure element 108.

The various components of the UE 100 or the secure application manager 118 as shown in FIG. 1 can be implemented as discrete packages. Alternatively, one or more of these components can be integrated into a single package (integrated circuit), such as in a system-on-a-chip (SOC) type of package.

Figure 2:
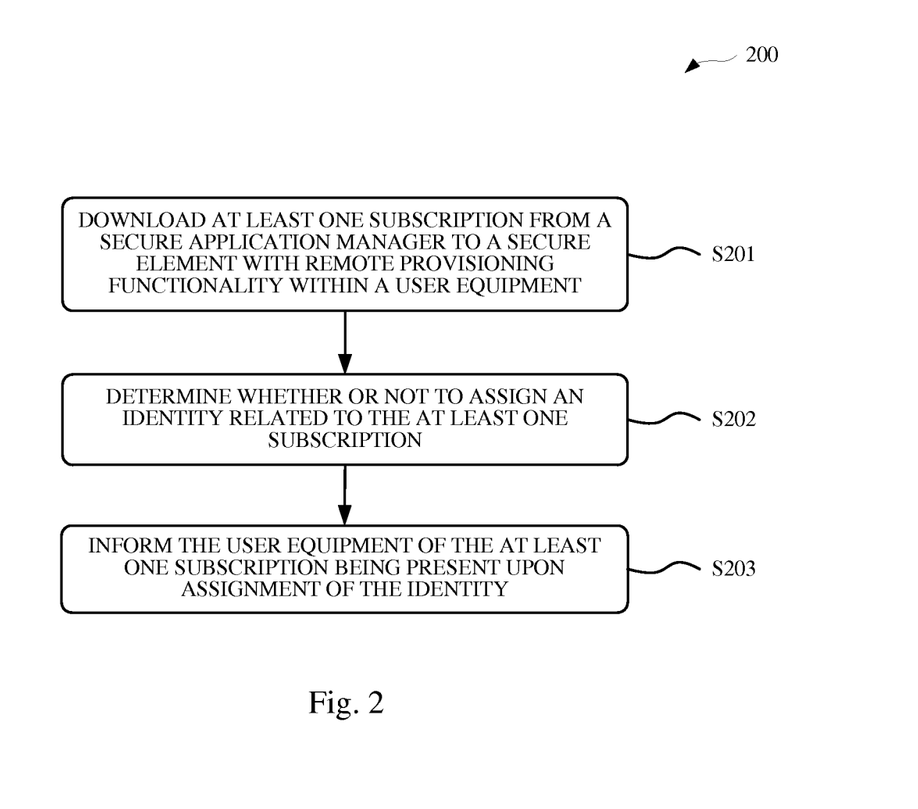
FIG. 2 is a logic flow diagram that illustrates the operation of a method, and a result of execution of computer program instructions embodied on a computer readable medium, in accordance with the example embodiments of this invention.

The foregoing has discussed in connection with FIG. 1 the system in which the example embodiments of the present invention can be practiced. Referring to FIG. 2, it shows a logic flow diagram that illustrates the operation of a method 200, and a result of execution of computer program instructions embodied on a computer readable medium, in accordance with the example embodiments of the present invention.

In accordance with some example embodiments, at S201, at least one subscription is downloaded from a secure application manager to a secure element with remote provisioning functionality within a UE. In an example embodiment, the secure application manager may be embodied as a subscription manager (SM). At S202, the secure element determines whether or not to assign an identity related to the at least one subscription. At S203, the secure element informs the UE of the at least one subscription being present upon assignment of the identity.

According to some example embodiments, the method 200 may further comprise providing an initial identity (for example, an IMEI or certificate) to the UE for connection to the secure application manager. In an example embodiment, the secure element accepts the initial identity from the UE manufacturer during the manufacturing process or originally from a third party which provides the initial identity to the manufacturer, which forwards it to the secure element.

According to some example embodiments, determining whether or not to assign the identity related to the at least one subscription of method 200 may further comprise determining whether an identity (for example, the IMEI or certificate) has been assigned to the at least one subscription, and assigning an identity to the at least one subscription if one has not been assigned. The method may further comprise requesting an identity from a pool of identities and assigning the identity to the at least one subscription. According to some example embodiments, the pool of identities are maintained within the UE or by a remote entity from which the pool of identities are downloadable to the UE. In an example embodiment, the remote entity is a trusted entity and could be embodied as the secure application manager or a server operated by the UE manufacturer. According to some example embodiments, the pool of identities are linked to a same secure element identity (for example, the same UICC chip ID).

According to some example embodiments, method 200 further comprises informing the UE of the at least one subscription being present via an API. In some embodiments, the UE is informed that the subscription is active or gets activated.

According to some example embodiments, method 200 further comprises informing, by a message, the secure application manager of successful installation of the at least one subscription, wherein the message includes the identity (for example, the IMEI or certificate) related to the at least one subscription and an identity of the secure element (for example, a UICC chip ID.)

In accordance with the paragraphs above, wherein the secure element with remote provisioning functionality is implemented on a removable chip or a physically embedded chip. Additionally, in case the secure element with remote provisioning functionality is implemented on the removable chip, the method 200 further comprises establishing a security association with the secure application manager to prevent the identities from being compromised.

In accordance with the paragraphs above, wherein the identities are IMEIs or certificates and bound to a plurality of applications.

The embodiments of the invention also encompass a computer program product that comprises computer readable program portion comprising program code instructions, where execution of the program code instructions by at least one processor results in performance of operations that comprise execution of the method of FIG. 2 and the several paragraphs descriptive of FIG. 2.

Further in this regard it should be noted that the various blocks of the logic flow diagrams of FIG. 2 may represent program steps, or interconnected logic circuits, blocks and functions, or a combination of program steps and logic circuits, blocks and functions for performing the specified tasks.

Figure 3:
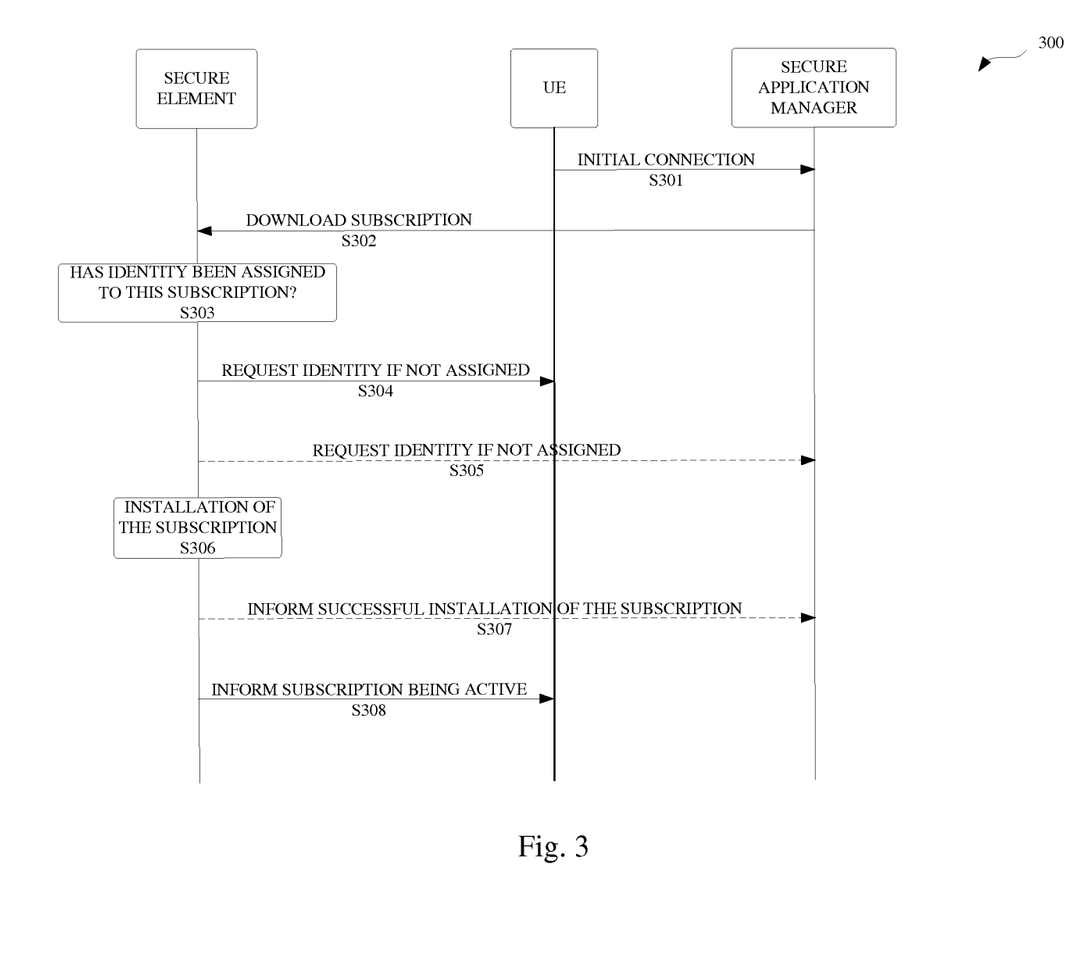
FIG. 3 shows an example message sequence chart showing one possible signaling flow.

FIG. 3 shows an example message sequence chart showing one possible signaling flow. As illustrated in FIG. 3, the flow starts with the UE, at the request of the user, establishing a communication connection with the secure application manager at S301. For establishing the communication connection, the UE may use a first identity and a first subscription with respect to the cellular channel. Alternatively, the connection can also be established by a non-cellular channel, for example, a WLAN channel, and therefore only the first identity is used. In this case, the subscription which will be downloaded from the secure application manager would become the first subscription.

Upon successful connection with the secure application manager (for example, the SM), at S302, the subscription will be downloaded to the secure element, for example, eUICC in the example embodiments of the present invention.

According to example embodiments, the secure application manager may store the device identity (for example, an IMEI or certificate) together with the respective subscription. For example, if a downloaded subscription is referred to as subscription 2, the secure application manager may store subscription 2 together with IMEI 2. This may require that the secure application manager receive, from a trusted source, an identity of the UE (for example, IMEI 1) before the download process and that the device identity be known to the eUICC.

Upon receipt of the subscription, at S303, the secure element (for example, eUICC) checks whether the subscription has been assigned an identity (for example, an IMEI or certificate). If this is not the case, then at S304, the secure element may request a free identity (for example, an unused IMEI or certificate) from the UE. In some example embodiments, the UE may have a pool of identities (for example, IMEIs or certificates) and assign a free identity (for example, an unused IMEI or certificate) from the pool of unused to the subscription. Similar to keeping a pool of identities in the UE, the pool of identities may be stored in the secure element. Thus, in some example embodiments, the secure element may have a pool of identities (for example, IMEIs or certificates) and assign a free identity (for example, an unused IMEI or certificate) from the pool of unused identities to the subscription.

According to example embodiments of the present invention, in a multi-subscription-enabled UE (for example, a multi-SIM-enabled UE), two approaches for managing the pool of identities can be followed, which are further described here.

According to a flexible approach a first identity (for example, IMEI or certificate) is assigned to the UE during production by the manufacturer. Other identities (for example, IMEIs or certificates) are then downloaded from the secure application manager on behalf of the manufacturer. The secure application manager is capable of identifying the manufacturer based on information in the first identity, for example, the TAC information in an IMEI, or information contained in a certificate.

According to a static approach, the manufacturer assigns at manufacturing a fixed number of identities (for example, IMEIs or certificates) to the UE in dependence on the UE characteristics, for example, storage capacity, transceiver support, and frequency bands. The UE would then manage the pool of identities.

In the flexible approach, the identities (for example, IMEIs or certificates) are requested from a trusted entity, for example, the secure application manager as shown at S305 in FIG. 3, or a server operated by the UE manufacturer that keeps the pool of identities (for example, IMEIs or certificates).

It is to be understood that in some embodiments in which the UE and the secure application manager both have respective pools of identities, any new subscriptions downloaded to the UE would need to request an IMEI from the secure application manager if the pool of the UE becomes exhausted.

To ensure security communications, the UE and the secure element (for example, eUICC) might be required to prove that the UE is acceptable, secure and trustworthy in order to prevent identities (for example, IMEIs or certificates) from being stolen or compromised. For instance, a telecommunication system operator may send a subscription to the secure element (for example, eUICC) and needs know whether the UE can be trusted. For example, if the UE is a personal computer, there might be a risk of cloning of the subscription and loss of revenue. Therefore, if an operator receives an identity (for example, IMEI or certificate), it needs to know if the identity is trustworthy. This proof is of special importance if the secure element (for example, eUICC) is implemented on a removable form factor.

Returning to FIG. 3, at S306, once the downloaded subscription has been assigned an identity (for example, an IMEI or certificate) obtained from a pool of identities (either at the UE or secure application manager as described above), the subscription should be the one installed and set to be active, in addition to or in place of a previously-installed subscription, if any. At S307, the secure application manager is informed of the successful installation of the downloaded subscription. This could be implemented through a message that may contain the newly-assigned identity (for example, IMEI or certificate) and a secure element identity (for example, a UICC chip ID.) At S308, the UE is informed via an API that the downloaded subscription can be made active. For example, if two subscriptions are stored in the secure element (for example, the eUICC), then both subscriptions could be made active. In case only one subscription is supposed to be active, then a confirmation from the secure element (for example, the eUICC) that the transition between the two subscriptions can take place is needed. In this way, the user of the UE may be apprised of how many subscriptions could be active and which one(s) of them is (are) now active or become active.

The foregoing has discussed further details of the example embodiments of the present invention in connection with FIG. 3. It should be noted that the steps and their orders are shown for illustrative purposes and should not be construed as limiting the scope of the present invention. The order of the steps can be changed and replaced as appropriate. For example, S307 can be carried out after S308.

In addition, in accordance with the example embodiments of the invention, there is an apparatus comprising means for downloading at least one subscription from a secure application manager to a secure element with remote provisioning functionality within a UE. The apparatus also comprises means for determining whether or not to assign an identity (for example, an IMEI or certificate) related to the at least one subscription. The apparatus further comprises means for informing the UE of the at least one subscription being present upon assignment of the identity.

Additionally, in accordance with the example embodiments of the invention, there is an apparatus comprising at least one processor and at least one memory including compute program instructions. The at least one memory and computer program instructions are configured to, with the at least one processor, cause the apparatus to perform downloading at least one subscription from a secure application manager to a secure element with remote provisioning functionality within a UE. The at least one memory and computer program instructions are configured to, with the at least one processor, also cause the apparatus to perform determining whether or not to assign an identity related to the at least one subscription. The at least one memory and computer program instructions are configured to, with the at least one processor, further cause the apparatus to perform informing the UE of the at least one subscription being present upon assignment of the identity.

According to some example embodiments, wherein the at least one memory and computer program instructions are configured to, with the at least one processor, cause the apparatus to further perform providing an initial identity to the user equipment for connection to the secure application manager.

According to some example embodiments, wherein the at least one memory and computer program instructions are configured to, with the at least one processor, cause the apparatus to further perform accepting the initial identity from a manufacturer of the user equipment during a manufacturing process or from a third party which provides the initial identity to the manufacturer.

According to some example embodiments, wherein the at least one memory and computer program instructions are configured to, with the at least one processor, cause the apparatus to further perform determining whether the identity has been assigned to the at least one subscription, assigning the identity to the at least one subscription if it has not been assigned or requesting from a pool of identities a free identity and assigning the free identity to the at least one subscription if the identity has been assigned.

According to some example embodiments, wherein the pool of identities are maintained within the user equipment or by a remote entity from which the pool of identities are downloadable to the user equipment.

According to some example embodiments, wherein the pool of identities are linked to a same secure element identity.

According to some example embodiments, wherein informing the user equipment of the at least one subscription being present is via an application program interface.

According to some example embodiments—wherein the at least one memory and computer program instructions are configured to, with the at least one processor, cause the apparatus to further perform informing, by a message, the secure application manager of successful installation of the at least one subscription, wherein the message includes the identity related to the at least one subscription and an identity of the secure element.

According to some example embodiments, wherein the secure element with remote provisioning functionality is implemented on a removable chip or a physically embedded chip.

According to some example embodiments, wherein the secure element with remote provisioning functionality is implemented on the removable chip and wherein the at least one memory and computer program instructions are configured to, with the at least one processor, cause the apparatus to further perform establishing a security association with the secure application manager to prevent the identities from being compromised.

According to some example embodiments, wherein the identities are certificates or international mobile equipment identities which are contained in the certificates and bound to a plurality of applications.

In general, the various embodiments of the UE can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "couple" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   downloading, to a secure element at a user equipment, at least one subscription, wherein the at least one subscription is downloaded from a secure application manager, and wherein the secure element provides remote provisioning functionality;
   determining whether or not to assign a device identity to the at least one subscription; and
   in response to an assignment of the device identity to the at least one subscription, providing, by the secure element, an indication that the at least one subscription is present on the user equipment.

2. The method according to claim 1, further comprising:
   providing an initial device identity to the user equipment for connection to the secure application manager.

3. The method according to claim 2, further comprising:
   accepting the initial device identity from a manufacturer of the user equipment during a manufacturing process or from a third party which provides the initial device identity to the manufacturer.

4. The method according to claim 1, wherein determining whether or not to assign a device identity to the at least one subscription comprises:
   determining whether a device identity has been assigned to the at least one subscription; and
   when a device identity has not been assigned to the at least one subscription:
      requesting, from a pool of device identities, a free device identity; and
      assigning the free device identity to the at least one subscription.

5. The method according to claim 4, wherein the pool of device identities are maintained within the user equipment or by a remote entity from which the pool of device identities are downloadable to the user equipment.

6. The method according to claim 4, wherein the pool of device identities are linked to a same secure element identity.

7. The method according to claim 4, further comprising requesting, from the secure application manager, a new device identity, when a free device identity is not available from the pool of device identities.

8. The method according to claim 1, further comprising:
   transmitting, to the secure application manager, a message indicating a successful installation of the at least one subscription, wherein the message includes the device identity related to the at least one subscription and an identity of the secure element.

9. The method according claim 1, wherein the secure element is implemented on a physically embedded chip.

10. The method according to claim 9, wherein the secure element is implemented on a removable chip, wherein the secure element is configured to establish a security association with the secure application manager, and wherein establishing the security association prevents the device identities from being compromised.

11. The method according to claim 1, wherein the device identities are certificates or international mobile equipment identities which are contained in the certificates and bound to a plurality of applications.

12. An apparatus, comprising:
   at least one processor; and
   at least one memory including compute program instructions,
   wherein the at least one memory and computer program instructions are configured to, with the at least one processor, cause the apparatus at least to perform at least one of the following:
      download, to a secure element at the apparatus, at least one subscription, wherein the at least one subscription is downloaded from a secure application manager, and wherein the secure element provides remote provisioning functionality;
      determine whether or not to assign a device identity to the at least one subscription; and
      in response to an assignment of the device identity to the at least one subscription, providing, by the secure element, an indication that the at least one subscription is present on the apparatus.

13. The apparatus according to claim 12, wherein the apparatus is further configured to at least:
   provide an initial device identity to the user equipment for connection to the apparatus.

14. The apparatus according to claim 13, wherein the apparatus is further configured to at least:
   accept the initial device identity from a manufacturer of the user equipment during a manufacturing process or from a third party which provides the initial device identity to the manufacturer.

15. The apparatus according to claim 12, wherein the apparatus is further configured to at least:
   determine whether a device identity has been assigned to the at least one subscription; and
   when a device identity has not been assigned to the at least one subscription:
      request, from a pool of device identities, a free device identity; and assign the free device identity to the at least one subscription.

16. The apparatus according to claim 15, wherein the pool of device identities are maintained within the apparatus or by a remote entity from which the pool of device identities are downloadable to the apparatus.

17. The apparatus according to claim 15, wherein the pool of device identities are linked to a same secure element identity.

18. The apparatus according to claim 12, wherein the apparatus is further configured to at least:
    transmit, to a secure application manager, a message indicating a successful installation of the at least one subscription, wherein the message includes the device identity related to the at least one subscription and an identity of the secure element.

19. The apparatus according to claim 12, wherein the secure element is implemented on a physically embedded chip.

20. The apparatus according to claim 19, wherein the secure element is implemented on a removable chip, wherein the secure element is configured to establish a security association with the secure application manager, and wherein establishing the security association prevents the device identities from being compromised.

21. The apparatus according to claim 12, wherein the device identities are certificates or international mobile equipment identities which are contained in the certificates and bound to a plurality of applications.

22. The apparatus according to claim 15, wherein the apparatus is further configured to request, from the secure application manager, a new device identity, when a free device identity is not available from the pool of device identities.

* * * * *